United States Patent Office 2,723,979
Patented Nov. 15, 1955

2,723,979

4-AMINO-5-HYDROXY-2,6-DI(HYDROXYMETHYL)-PYRIMIDINE AND PROCESS OF PREPARING SAME

Donald B. Lake, Grand Island, N. Y., assignor to E. I. du Pont de Nemours and Company, Wilmington, Del., a corporation of Delaware No Drawing. Application August 2, 1954,
Serial No. 447,420

3 Claims. (Cl. 260—256.4)

This invention relates to a new composition of matter, the trimer of glycolonitrile, and to a method for making the same.

Various methods have been described in the literature for preparing 4-aminopyrimidines from nitriles. Generally, these methods have involved the use of large quantities of a condensing agent, frequently in amount molecularly equivalent to the nitrile being condensed. Thus, Ronzio and Cook, Organic Synthesis, 24, 6 (1944) recommend the use of 70 grams of sodium methoxide to condense 41 grams of acetonitrile to 4-amino-2,6-dimethylpyrimidine. Larcher, U. S. P. 2,540,826, has simplified this procedure to some extent by reducing the quantity of methoxide necessary to a catalytic amount.

The known processes have largely been restricted to the condensation of simple nitriles. Larcher is an exception in that he mentions the condensation of long chain nitriles such as stearonitrile and bifunctional nitriles such as ethylenecyanhydrin. This investigator, however, fails to exemplify condensation of the more complicated nitriles. Neither Larcher nor any other investigator, so far as known, has mentioned the production of a 4-aminopyrimidine by condensation of glycolonitrile or formaldehyde cyanhydrin, a compound of particular interest in the present application.

A major objective of this invention is provision of a new composition of matter, the trimerization product of glycolonitrile, 4-amino-5-hydroxy-2,6-di(hydroxymethyl)-pyrimidine. Another object of the invention is provision of a process for making the new glycolonitrile trimer. A further object is provision of a method for making this new trimer without the use of special condensation agents.

The above-mentioned and still further objects may be achieved in accordance with this invention by a process in which anhydrous formaldehyde cyanhydrin is rendered slightly alkaline and allowed to stand. A pH of 7–9 is sufficient to bring about the desired condensation and this may readily be provided by a small amount of aqueous caustic solution. The optimum temperature for the reaction is rather low, at least about 0°–5° C. for best results. At room temperature an alkaline glycolonitrile solution will decompose exothermally to a brown, water-soluble resin. The equation for the condensation occurring under the preferred conditions noted may be written as follows:

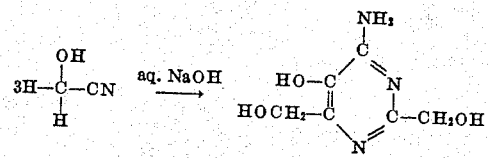

The desired trimer does not precipitate immediately upon adjustment of the pH of the glycolonitrile. Several hours are required to obtain an appreciable yield. When the alkaline solution is allowed to remain at rest for 2–4 hours at 0°–5° C. the trimer separates as a white crystalline mass. If mechanical or air agitation is employed for the same time, the trimer precipitates as a fine white powder.

It has been found that the material formed in the latter stages of the polymerization is more unstable than that produced in the earlier stages. The increasing instability probably results from the diminishing glycolonitrile content of the solution. The reaction should, therefore, be terminated while the conversion is rather low, i. e. 40–50%.

The condensation product is a rather unstable white solid insoluble in most solvents even of organic nature and failing to recrystallize from the great majority of the solvents in which it does dissolve. These solubility characteristics sharply limit the reactions of the compound. The melting point of the material is in the vicinity of 95° C.

Despite its low solubility, the trimer may be used as an intermediate for organic reactions, as in the production of some dyes and drugs. It reacts readily with picric acid, for example, to form an orange solid quite similar to ammonium picrate. Like the latter, it may be utilized as an explosive. In addition, it serves to some extent as an antioxidant in rubber. Thus an elastomer based on pale crepe was compounded with various additions of the trimer. The time elapsing before rupture of this elastomer when stretched at 120° C. in a circulating air oven was several hours greater than the time required for rupture of an elastomer compounded without the timer and tested under identical conditions.

Details of this invention will be found in the following example.

*Example* a. *Preparation of the formaldehyde cyanhydrin.*—Formaldehyde cyanhydrin was purchased as a commercial 70% solution and distilled through a 30 centimeter Vigreux column. The clear anhydrous material boiling at 65° C. under 4 mm. of mercury pressure and exhibiting a refractive index $n_D^{17}$ 1.4117 was collected. About 5–10 drops of 85% phosphoric acid was needed to stabilize 500 cc. of the anhydrous glycolonitrile and was added to the receiver prior to distilling. This precaution was important since unstabilized material may decompose with violence during distillation. In addition, the temperature of a glycolonitrile distillation should not exceed 90° C. since at higher temperature even the stabilized material is dangerous.

b. *Preparation of the trimer.*—Aqueous sodium hydroxide solution (10%) was added to bring the pH of the acid-stabilized glycolonitrile (11.4 grm., 0.2 mole) to 8.0. Approximately 1 cc. of the hydroxide was required. The solution was placed in a refrigerator at 0–5° C. and ambient pressure and allowed to stand overnight. Crystals were formed on the bottom of the flask. The solid was broken up, and removed by filtration. The filtrate was then returned to the refrigerator. A second batch of crystals precipitated on short standing. These were collected, combined with the first batch, triturated in dry acetone, filtered, and air dried. Yield, 5.4 gms. (47% of theory); MP 90–95° C.

c. *Characterization of the compound.*—Analyses of the product gave the following data:

|  | Percent Carbon | Percent Hydrogen | Percent Nitrogen |
|---|---|---|---|
| Calculated | 42.1 | 5.3 | 24.6 |
| Found | 41.7 | 5.2 | 24.2 |

A van Slyke amino nitrogen determination showed the existence of one free amino group in the compound.

Proof of the assigned structure was established by molecular weight determinations and by hydrolytic degradation studies from which glycolamide, glycoliminohydrin and glyoxal were obtained.

Having described my invention, I claim:

1. The compound 4-amino-5-hydroxy-2,6-di(hydroxymethyl)-pyrimidine having the structural formula:

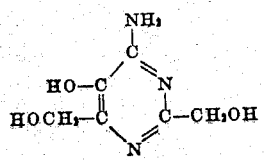

2. The method of preparing 4-amino-5-hydroxy-2,6-di(hydroxymethyl)-pyrimidine which comprises polymerizing glycolonitrile in aqueous alkaline solution.

3. The method of claim 2 characterized in that the temperature during the polymerization is maintained at around 0°–5° C.

No references cited.